(12) United States Patent
Augustine et al.

(10) Patent No.: US 10,013,505 B1
(45) Date of Patent: Jul. 3, 2018

(54) METHOD, APPARATUS AND COMPUTER PROGRAM PRODUCT FOR IDENTIFYING A TARGET PART NAME WITHIN A DATA RECORD

(75) Inventors: David C. Augustine, Seattle, WA (US); Anne Kao, Bellevue, WA (US); Stephen R. Poteet, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 1124 days.

(21) Appl. No.: 12/686,653

(22) Filed: Jan. 13, 2010

(51) Int. Cl.
*G10L 15/18* (2013.01)
*G06F 17/40* (2006.01)
*G06F 17/30* (2006.01)

(52) U.S. Cl.
CPC ........ *G06F 17/40* (2013.01); *G06F 17/30005* (2013.01)

(58) Field of Classification Search
USPC ................................................ 705/28; 704/9
See application file for complete search history.

(56) References Cited

U.S. PATENT DOCUMENTS

| 6,003,808 A * | 12/1999 | Nguyen .................... B64F 5/60 244/1 R |
| 7,540,430 B2 | 6/2009 | Jones et al. |
| 8,935,199 B2 * | 1/2015 | Roulland .......... G06F 17/30734 704/257 |
| 2008/0126080 A1 * | 5/2008 | Saldanha ............ G06F 17/2229 704/9 |
| 2009/0144609 A1 * | 6/2009 | Liang .................... G06F 17/278 715/230 |

\* cited by examiner

*Primary Examiner* — Talia F Crawley
(74) *Attorney, Agent, or Firm* — Alston & Bird LLP

(57) ABSTRACT

A method, apparatus and computer program product are provided for identifying a part name within a data record. A maintenance expression is initially identified within a data record and a candidate part name string is then identified by identifying a head noun within a window that is positioned within the data record based upon the expression. In addition to identifying the head noun, a modifier may also be identified adjacent to or near any occurrence of the head noun in the course of identifying the candidate part name string. The candidate part name string may then be separately matched to respective ones of a plurality of standard names with each of a plurality of string matching techniques. The resulting potential matches are then analyzed to determine a best match.

26 Claims, 4 Drawing Sheets

☑ DEF:STS MSG|EQUIP|VENT|FAN.ACT|FAN|REPLACED MSG CLRD AUTOMATICALLY SATIS.BAX224. TAG OFF K80523W TAG ON B33203G.
DEF:STS MSG|EQUIP|VENT|FAN.ACT|FAN|REPLACED MSG CLRD AUTOMATILLY SATIS.BAX224. TAG OFF K80526W TAG ON B33203G.

0.701  EQUIP COOLING VENTILATION FAN, B21583 (P110)
0.660  EQUIP COOLING SUPPLY FAN (LEFT), B21581 (P110)
0.650  EQUIP COOLING SATCOM BKUP FAN (LEFT), B21265 (P110)
0.648  EQUIP COOLING SUPPLY FAN (RIGHT), B21582 (P210)
0.640  EQUIP COOLING SATCOM BKUP FAN (RIGHT), B21266 (P210)

[ Choose Preferred Part ]

FIG. 2

Preferred Part Selector

DEF: STATUS MESSAGE IN FLIGHT CARGO HEAT VLV BULK LASTED FOR 10 MIN ONLY ACT TO ADD VALVES VISUALLY VERIFIED CLOSED-NO LIVE ANIMALS MAINTENANCE ACTIONS C/W DEF:. REF ADD 0620 STS MSG IN FLT BULK CARGO HEAT VALVE INOP. ACT: BULK CARGO TEMP CONTROL VALVE REPLACED.CMC TEST PASSED MESSAGE CLEAR. BAX227 PJD TAG OFF M22861C TAG ON B19451K

| Score | Std Partname | Preferred Part |
|---|---|---|
| 0.665 | ECONOMY COOLING CHECK VALVE (R PAC) | ☐ |
| 0.665 | ECONOMY COOLING CHECK VALVE (L PACK) | ☐ |
| 0.661 | CARGO HEAT TEMP CONTROL VALVE (BULK), V21444 (P210) | ☑ |
| 0.659 | ZONE TRIM MODULATING VALVE FOR ZONE F | ☐ |
| 0.659 | ZONE TRIM MODULATING VALVE FOR ZONE E | ☐ |

← 34

↙ 32

Standard Part Name Look Up

This form allows you to look up multiple standard Part Name(s) and add them as the preferred part(s).

You may enter a whole word or just part of a word.
A space represents an AND     AND Example
A comma represents an OR      OR Example
You may enter a '*' for wildcard i.e. 'S*N*S*R'     Wildcard Example Part name: [bulk cargo]
Airplane Model: [777 ▾]  ATA: [21 ▾]
[Search]    Count: 4

Select Partname

☐ CARGO HEAT SHUTOFF VALVE (BULK), V21443 (P210)
☐ BULK CARGO VENTILATION FAN, B21263 (P210)
☐ CARGO COMPARTMENT TEMP SENSOR (BULK)M M21442
☑ CARGO HEAT TEMP CONTROL VALVE (BULK), V21444 (P210)

These are your selected parts:

CARGO HEAT TEMP CONTROL VALVE (BULK), V21444 (P210)

[ <--- Add new Standard Part ]    [ Clear Partnames ]

[Close]

METHOD, APPARATUS AND COMPUTER PROGRAM PRODUCT FOR IDENTIFYING A TARGET PART NAME WITHIN A DATA RECORD

TECHNOLOGICAL FIELD

Embodiments of the present disclosure relate generally to the analysis of data records and, more particularly, to the identification of standard names within a data record.

BACKGROUND

Data records are created in many different applications, such as to provide a record of observations, actions taken or the like. In many instances, the data records are populated by free-form text that is entered by an author in order to document a particular event or activity. In order to sort, interpret or otherwise process the data records, it is oftentimes desirable to identify particular information, such as a part name, within the data records. For example, it may be desirable to identify every data record that includes a particular part name so as to identify trends or issues or to otherwise discern the current status. Since data records are commonly populated with free-form text, it may be difficult to consistently identify particular part names within the data records. In this regard, as the data records are frequently authored by different people, different expressions may be utilized to represent the same concepts. Additionally, certain information, such as part names, within a data record may be abbreviated or misspelled or acronyms may be employed which further complicate efforts to consistently identify particular information within the data records.

By way of example, the airline industry relies upon data records entered by mechanics relating to the results of inspections, repairs that have been undertaken and the like. The principal job of these mechanics is to maintain the aircraft in conformance with a schedule, such as a flight schedule or a maintenance schedule. These duties typically leave only limited time for documentation of the activities undertaken by the mechanics. As such, the mechanics may create data records in a relatively expedited fashion including, for example, the liberal use of abbreviations and acronyms, some of which are widely understood and some of which are developed ad hoc by the mechanics based upon, for example, the working conditions. As with the creation of any written record, the resulting data records may include spelling errors, erroneous spaces in words, omissions of spaces between words, or other typographical errors. Such misspellings and abbreviations may make it somewhat difficult to identify a particular word within a data record. By way of example, a computer may be referenced within a data record as a computer, a comptr, a compter, a computor, or a computo. Complicating the situation, "comp" within a data record may reference a computer; however, it may, instead, reference a compressor, compartment, or a compensator.

As a more particular example, one standard part name is: Overhead Panel Bus Controller (L). Within a data record, however, the Overhead Panel Bus Controller (L) may be differently referenced, such as follows:
   COMPLAINT: REF ADD 913 STS MSG LEFT O/H PNL BUS CONTROLLER INTERMITENT TAGS OFF K02648Y
   RESOLUTION: FIM ACTIONED AS PER MSG 23-48802 OPBC REPLACED IAW MM 23-93-01 GRND CHKS AND TESTS C/OUT SATIS TAGS ON B25092G As demonstrated in the foregoing example, the Overhead Panel Bus Controller (L) may be referenced as an "O/H PNL BUS CONTROLLER" and an "OPBC".

The inconsistencies within data records as to the manner in which part names are referenced therefore makes any subsequent identification of part names within the data records a challenge. This challenge is exacerbated by the large number of different part names, such as several thousand part names in the airline industry, with some of the part names only varying slightly from other part names. Within the airline industry, the terminology, including the part names, may vary from airline to airline, from model to model, from fleet to fleet and/or from location to location, thereby further increasing the complexity of any subsequent efforts to analyze the data records. Furthermore, the number of data records may also be substantial and, in some instances, may number in the hundreds of thousands, thereby requiring that any technique for analyzing the data records be quite efficient if it is to be practical.

Techniques have been developed to identify information within data records that include free-form text. For example, efforts have been made to construct a knowledge base including lists of synonyms for at least some of the part names that appear within the data records. In this regard, the list of synonyms may include spelling variations including common misspellings as well as different names for the same part that are employed by different airlines. The data records may then be searched to identify data records that include one or more words or phrases as well as data records that include one or more synonyms for the words or phrases. Because of the substantial number of variations for any one word or phrase and further because of the challenges associated with handling ambiguities within a list of synonyms as a result of the absence of any context, the development of lists of synonyms for a number of words or phrases may be impractical such that efforts to develop a knowledge base including a synonym list for various words or phrases may prove to be less effective than desired.

Pattern recognition tools have also been developed to identify information within data records containing free-form text. In this regard, text mining algorithms and statistical methods have been developed to derive patterns based on context words with varying levels of success. However, in instances in which the context words have a large number of variations, it has proven somewhat difficult for pattern recognition tools to have as high of a rate of success as would be desired.

Natural language processing techniques have also been developed in which each sentence in a data record is parsed as subject, verb, object, etc. and semantic meaning is attached thereto. Such natural language processing techniques have proven to be a challenge as the large number of ad hoc spellings and incorrect spellings make the identification of lexical items difficult, while the ungrammatical style of writing that is employed within some data records may increase the difficulty of parsing.

Spell checkers have also been suggested in conjunction with the authoring and processing of data records. In this regard, a spell checking tool would ask an author or other user to select the correctly spelled version of a word if a word were determined to be misspelled. In addition to being relatively impractical given the large number of ad hoc and wrong spellings, such spell checking tools generally do not address acronyms and abbreviations which are frequently included within data records.

Another approach is to manually write detailed patterns based on regular expressions. This approach provides a great deal of power and flexibility in dealing with many variants and misspellings. However, most users are not particularly adept in writing regular expressions, even with the use of tools to build basic regular expressions for the words in a part name and to help them assess the results against the data. Furthermore, regular expressions cannot deal with certain types of common errors such as character transpositions and the different patterns for the same word may be required depending upon the context, which further complicates the analysis. Finally, building adequate regular expressions is very time consuming, making it difficult to extend the list of part names covered to new models or customers.

As such, it would be desirable to provide an improved technique for identifying words or phrases within data records. In this regard, it would be desirable to provide an improved technique for identifying words or phrases within data records consisting of free-form text, such as that entered by mechanics or other authors.

BRIEF SUMMARY

According to embodiments of the present disclosure, a method, apparatus and computer program product are provided for identifying a word or phrase within a data record, even in instances in which the data record is populated with free-form text that may include various misspellings, acronyms, abbreviations or the like. Indeed, the processing of the contents of a data record, as contemplated by embodiments of the present disclosure, permits words or phrases, such as standard names, e.g., part names, to be identified in a reliable and efficient manner. As such, the analysis of data records may be facilitated by employing embodiments of the present disclosure.

In one embodiment, a method is provided that analyzes a set of standard part names into a head noun and any modifiers. The method then identifies an expression from a set of desired maintenance expressions within a data record and then identifies a candidate part name string by identifying a head noun that was previously identified during analysis of the set of standard part names and that is within a window that is positioned within the data record based upon the expression. In addition to identifying the head noun, one or more modifiers may also be identified adjacent to or near the head noun in the course of identifying the candidate part name string in accordance with one embodiment of the present disclosure. In regards to identifying one or more modifiers, the modifiers may be located either near the head noun that is within the window relative to the expression or near another occurrence of the head noun within the same data record. The method of this embodiment then separately matches the candidate part name string to respective ones of a plurality of standard names with each of a plurality of string matching techniques.

In one embodiment, the method also determines a similarity score for each of the plurality of matches of a candidate part name string. In this regard, each match may be identified that has a similarity score bearing a predefined relationship to a threshold, such as by having a similarity score greater than a predefined threshold. In one embodiment, the method may also identify a best match from among a plurality of matches of the candidate part name string. In this regard, the best match may be identified by voting amongst the plurality of string matching techniques.

In another embodiment, an apparatus is provided that includes a processor configured to analyze a set of standard part names into a head noun and any modifiers. The processor is also configured to identify an expression from a set of desired maintenance expressions within the data record. The processor is also configured to identify a candidate part name string by identifying a head noun that was previously identified during analysis of the set of standard part names and that is within a window that is positioned within the data record based upon the expression. In one embodiment, the processor may be further configured to identify one or more modifiers adjacent to or near the head noun so as to further identify the candidate part name string. The processor of this embodiment is also configured to separately match the candidate part name string to respective ones of a plurality of standard names with each of a plurality of string matching techniques.

The processor may be further configured to determine a similarity score for each of a plurality of matches of the candidate part name string. In this regard, the processor may be configured to identify each match that has a similarity score bearing a predefined relationship to a threshold. In one embodiment, the processor may be further configured to identify the best match from among the plurality of matches of the candidate part name string. In this regard, the best match may be identified by the processor by voting amongst the plurality of string matching techniques.

In another embodiment, a computer program product including a computer-readable storage medium having computer-readable program code portions stored therein is provided. The computer-readable program code portions include an executable portion configured to analyze a set of standard part names into a head noun and any modifiers as well as an executable portion configured to identify an expression from a set of desired maintenance expressions within a data record. The computer-readable program code portions of this embodiment also include an executable portion configured to identify a candidate part name string by identifying a head noun that was previously identified during analysis of the set of standard part names and that is within the window that is positioned within the data record based upon the expression. In one embodiment, the executable portion that is configured to identify the candidate part name string may be further configured to identify one or more modifiers adjacent to or near the head noun. The computer-readable program code portions of this embodiment also include an executable portion configured to separately match the candidate part name string to respective ones of a plurality of standard names with each of a plurality of string matching techniques.

In a further embodiment, the computer program product includes an executable portion configured to determine a similarity score for each of a plurality of matches of a candidate part name string. In this regard, the computer program product may also include an executable portion configured to identify each match that has a similarity score bearing a predefined relationship to a threshold. In another embodiment, the computer program product may include an executable portion configured to identify a best match from among a plurality of matches of the candidate part name string. In this embodiment, the executable portion configured to identify the best match may be further configured to vote amongst the plurality of string matching techniques to identify the best match.

The features, functions and advantages that have been discussed can be achieved independently in various embodiments of the present disclosure and may be combined in yet other embodiments, further details of which can be seen with reference to the following description and drawings.

BRIEF DESCRIPTION OF THE SEVERAL VIEWS OF THE DRAWINGS

Figure 1:
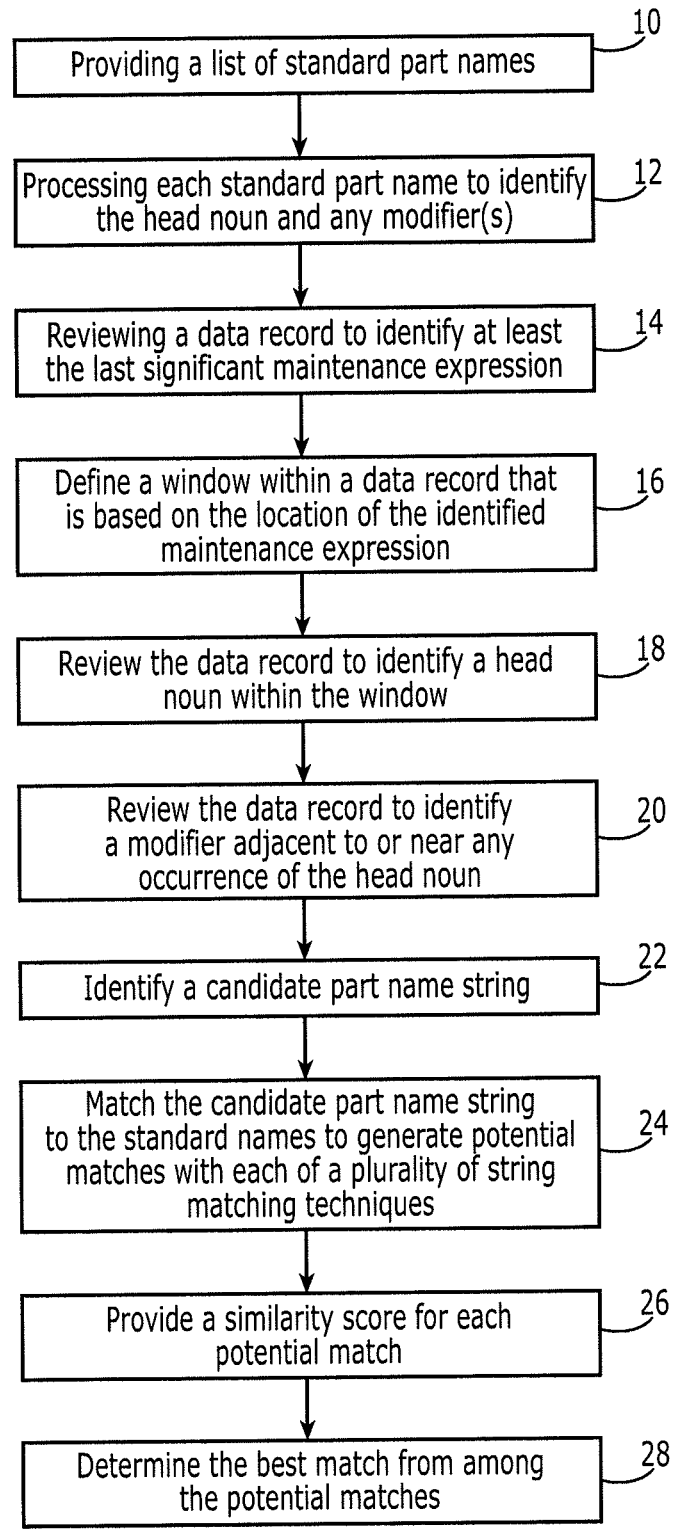
Figure 4:
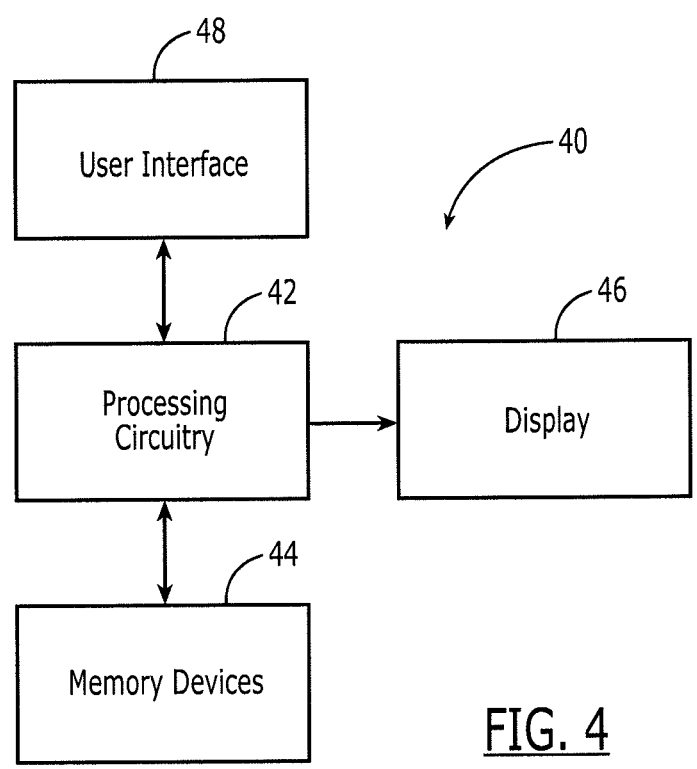

Having thus described embodiments of the present disclosure in general terms, reference will now be made to the accompanying drawings, which are not necessarily drawn to scale, and wherein:

FIG. 1 is a flow chart illustrating operations performed in accordance with one embodiment of the present disclosure;

FIG. 2 is an illustration of a plurality of matches of a candidate part name string as well as similarity scores associated with each match in accordance with one embodiment of the present disclosure;

FIG. 3 is an illustration of a plurality of matches for a candidate part name string and the associated similarity scores as well as the designation of a standard part name as a preferred part for a data record in accordance with one embodiment of the present disclosure; and FIG. 4 is a block diagram of a system in accordance with one embodiment of the present disclosure.

DETAILED DESCRIPTION

A more full description will be provided hereinafter with reference to the accompanying drawings, in which some, but not all embodiments are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout.

Data records are created in a variety of applications and for a variety of purposes. By way of example, data records are created in order to memorialize maintenance activities that occur for aircraft, such as following an inspection of an aircraft or following the performance of a particular maintenance action. For purposes of illustration but not of limitation, the analysis of the data records created during the maintenance of an aircraft will be described below. However, embodiments of the present disclosure are also applicable to the analysis of other types of data records including the data records associated with the maintenance of other types of vehicles or structures as well as data records that are created for purposes other than to memorialize maintenance activities.

A data record may be compiled in various fashions. For example, a data record may be created by an author, such as a mechanic, with free form text so as to make a record of a particular activity. A data record commonly includes one or more standard names, such as one or more part names. For example, a data record may include a report relating to some activity taken with respect to a particular part, such as the inspection, replacement, repair or the like of the particular part. For all the reasons described above, the data record may be relatively difficult to decipher, particularly in an automated fashion, as a result of the manner in which the data records are constructed with freeform text and with many different abbreviations, misspellings and the like. In accordance with embodiments of the present disclosure, however, an apparatus and methods are provide to permit data records to be more efficiently and reliably analyzed so as to identify those data records that match or otherwise contain a particular standard name, such as a particular part name, with a greater degree of certainty. In order to support the comparison described below, a list of standard part names is provided and is then analyzed so as to identify the head noun and any modifier(s) that comprise each standard part name. See operations 10 and 12 of FIG. 1.

Each part name within the list of standard names is typically automatically or semi-automatically analyzed, generally in advance of the analysis of an individual data record, so as to identify a head noun and, in some embodiments, one or more core modifiers and/or a peripheral modifiers. See operation 12 of FIG. 1. The head noun is the noun that defines the general part type identified by the part name. For example, panel, switch, valve, controller and sensor are examples of head nouns. Some terms may serve as either head nouns or modifiers depending upon the context. For example, "door" may be a head noun in some standard part names, but a modifier in other standard part names, e.g., door latch. As such, in instances in which two or more possible head nouns are identified, embodiments of the present disclosure may employ predefined rules. For example, one predefined rule may designate the head noun to be the last or rightmost of the possible head nouns within a standard part name. Alternatively or in addition, another predefined rule to be employed in situations in which two possible head nouns are separated by a comma may designate the head noun to be the first or leftmost of the possible head nouns, e.g., the possible head noun preceding the comma. Part names may also include modifiers and the modifiers, in turn, may be classified as either core modifiers or peripheral modifiers. Core modifiers generally define the type of part represented by the head noun, while a peripheral modifier generally identifies a location of the part identified by the part name. For example, pressure, temperature, flow and turbine are examples of core modifiers, while left, right, forward and aft are examples of peripheral modifiers. By way of example, "exhaust" and "shutoff" are core modifiers in "aft cabin exhaust shutoff valve" and "bus" is a core modifier in "overhead panel bus controller". Thus, not only is a listing of standard names, such as standard part names, provided, but the part names have been analyzed so as to identify the head noun and any core modifier(s) and peripheral modifier(s) for each part name.

As shown in operation 14 of FIG. 1 and in accordance with one embodiment of the present disclosure, a data record is initially reviewed in order to identify a maintenance expression. A maintenance expression is generally a maintenance action or a maintenance status. For example, a maintenance expression may be a maintenance action verb. However, a maintenance expression may also be a noun, such as replacement, an adjective, such as inoperative or inop, or an acronym, such as NFF which represents No Fault Found. Regardless of its form, an apparatus and methods of one embodiment initially identify maintenance expressions, such as maintenance action verbs, since there are generally fewer number of distinct maintenance expressions than there are part names. In one embodiment, a list of maintenance expressions is predefined and may be supplemented by all words in the data records having a predetermined form, such as having the suffix "ed". By way of example with respect to the data records created in conjunction with aircraft maintenance activities, there may be thousands of different part names, but only dozens of maintenance expressions that will likely be included within the data records, thereby simplifying the initial review of the data records. For purposes of example, but not of limitation, embodiments of the present disclosure will be described hereinafter in conjunction with maintenance action verbs, although other types of maintenance expressions may be similarly identified and utilized in the same manner.

By way of example, a data record that memorializes the maintenance activities associated with the replacement of an inoperative aft overflow valve switch may be as follows:

. . . AFT OVERFLOW VALVE SWITCH INOP . . . REPLACED THE SWITCH. RECHECKED OK.

Although the apparatus and method of embodiments of the present disclosure may identify various types of expressions in a number of different manners, one embodiment of an apparatus and method that identifies maintenance action verbs will be described below for purposes of example, but not of limitation. In order to identify the maintenance action verbs, the apparatus and method of one embodiment may include a predefined list of maintenance action verbs with the predefined list generally being stored in a memory device as described below. As such, the apparatus and method of embodiments of the present disclosure may review the data record and identify each maintenance action verb within the data record based on a comparison of the terms within the data record to the listing of potential maintenance action verbs that has been defined in advance. In order to increase the likelihood that all maintenance action verbs are identified, the predefined list of maintenance action verbs may include not only the verbs, but also common misspellings, abbreviations, acronyms or the like that may represent the verbs. With respect the above example, the apparatus and method of one embodiment may identify "replaced" and "rechecked" as maintenance action verbs.

In one embodiment, the apparatus and method may classify the predefined listing of maintenance action verbs with some maintenance action verbs being identified to be more significant or of greater interest to engineers and analysts than other maintenance action verbs. Thus, the more significant maintenance action verbs may be predefined. By way of example, "replaced" and "removed" as well as variations thereof may be of greater interest than "recheck" and variations thereof. As such, "replace" and "remove" and variations thereof may be indicated to be more significant within the predefined listing of maintenance actions verbs than is "rechecked" and variations thereof. As such, in the course of identifying maintenance action verbs, the apparatus and method of one embodiment may only identify significant maintenance action verbs and ignore insignificant maintenance action verbs. With respect to the example provided above relating to the replacement of a switch, the apparatus and method of one embodiment may identify "replace" as a significant maintenance action verb, but may not identify "rechecked" as "rechecked" may be considered less significant or of no interest.

Some data records may include multiple maintenance action verbs and, in some examples may include multiple significant maintenance action verbs. In this instance, the method and apparatus of one embodiment may identify the maintenance action verb that occurs last within the data record so long as a maintenance action verb that occurs last is a significant maintenance action verb and not a less significant action verb, such as "checked" or "rechecked" as in the above example.

As shown in operation 16 of FIG. 1, the apparatus and method of one embodiment then defines a window consisting of a predefined number of words or characters within the data record with the location of the window based upon the location of the maintenance action verb identified within the data record. In one embodiment, the window is defined so as to include a predefined number of words or characters that occur immediately prior to the maintenance action verb and that occur immediately following the maintenance action verb. However, the window may extend in only one direction from the maintenance action verb such as by being defined to only include a predefined number of words or characters that occur immediately prior to the maintenance action verb or, alternatively, to only include a predefined number or words or characters that occur immediately after the maintenance action verb. Within the window, the method and apparatus of one embodiment then searches for a head noun and, if a head noun is located, identifies or flags the head noun. See operation 18 of FIG. 1. In this regard, a list of standard names, such as standard part names, may also be provided and may be stored by a memory device as described below. The list of standard names may be substantial and may include, for example, a thousand or more standard part names.

Thus, the apparatus and method of one embodiment may search within the window defined within the data record for a head noun and, if a head noun is located, identify or flag the head noun. In the forgoing example relating to the replacement of a switch, the data record is analyzed and the head noun "switch" is identified. In the forgoing example, a window is defined so as to include words both in advance of and following the maintenance action verb "replaced"; however, because of the number of words preceding "replaced" (represented by the ellipses), only the second instance of "switch" is identified initially within the window. This instance of switch is not adjacent to any of its modifiers. The particular type of switch being referred to in the data record was specified with the earlier reference to the switch. Because this situation occurs frequently, once a head noun has been found within a window in relation to a significant maintenance action verb, the rest of the record may be searched for other occurrences of that head noun. Modifiers found proximate to or near other occurrences of the head noun may also be used to construct the candidate part name string even if these other occurrences of the head noun are outside of the window that is defined in relation to the maintenance action verb. See operation 20 of FIG. 1. In one embodiment, the longest string of modifiers is used in constructing the candidate part name strings. In another embodiment, all the modifiers adjacent to or near either occurrence of the head noun are used in constructing the candidate part name strings.

Additionally or alternatively, in instances in which an equipment number is identified within the window, the method and apparatus of one embodiment need not further search within the window and may, instead, identify the part that is designated by the equipment number as the subject of the data record.

Core modifiers in general are more important in identifying the particular type of part than peripheral modifiers, since the same part type can occur in several locations. In the foregoing example regarding the replacement of a switch, "overflow valve" may be identified as a core modifier and "aft" may be identified as a peripheral modifier, based upon the prior analysis of the list of standard part names. In one embodiment, only the core modifiers are used to construct the candidate part name string to be matched with the list of target part names. In another embodiment, all the modifiers are used, but the core modifiers are weighted more heavily during the matching with the target part names.

Following the identification of the head noun and, in some embodiments, the additional identification of a core modifier and/or a peripheral modifier, a candidate part name string is identified consisting of the head noun and, in instances in which a core modifier and/or a peripheral modifier is identified, any modifier(s) that have been identified with respect to the head noun. See operation 22 of FIG. 1. In the foregoing example, the candidate part name string that is identified is "aft out flow valve switch".

Once a candidate part name string has been identified, the method and apparatus of one embodiment may utilize a plurality of different string matching techniques to match the candidate part name string to each of the plurality of standard names included in the list of standard part names. See operation 24 of FIG. 1. In this regard, the method and apparatus may employ a variety of different string matching algorithms, such as the Jaccard, Levenstein and/or JaroWinkler string matching algorithms.

For each string matching technique, the method and apparatus of one embodiment determines a list of potential matches of the candidate part name string relative to the list of standard names. Additionally, the method and apparatus of one embodiment may associate a similarity score with each potential match provided by at least one and, in some embodiments, each of the string matching techniques. See operation 26 of FIG. 1. The similarity score provides a quantitative measure of the similarity between the candidate part name string and a respective standard name with which the candidate part name string has been potentially matched. Although similarity scores may be defined in various manners, the similarity scores of one embodiment are defined within the range of zero to one with zero indicating the lack of any similarity between the candidate part name string and a respective standard name and one indicating a perfect match between the candidate part name string and a particular standard name. In one embodiment, a threshold may be predefined or may be set by a user with only those potential matches having a similarity score with a predefined relationship to the threshold, such as only those potential matches having a similarity score greater than the threshold, being identified as a potential match.

As shown in operation 28 of FIG. 1, the method and apparatus of one embodiment may identify the best match from among the plurality of potential matches. For example, the method and apparatus of one embodiment may identify the candidate match having the greatest similarity score from among the potential matches identified by the plurality of sting matching techniques to be the best match. The standard name that is identified as the best match may then be considered to have been referenced in the respective data record.

In other embodiments, however, the potential matches may be further processed in order to refine the assessment of the best match. Although the processing of the potential matches may be accomplished in various manners, the method and apparatus of one embodiment may consider the potential matches identified by each of the string matching techniques and may, in turn, identify those standard names that were identified as potential matches by the largest number of the string matching techniques. Thus, the method and apparatus of this embodiment may conduct voting among the potential matches identified by each string matching technique to identify those standard names that were identified by the largest number of the string matching techniques. For example, the method and apparatus of one embodiment may identify each part name that was identified as a potential match by a majority or a plurality of the string matching techniques as the best match. If more than one part name was identified as a potential match by a majority or a plurality of string matching techniques, the method and apparatus of one embodiment may determine the best match based upon secondary considerations, such as by identifying the part name that was identified as a potential match by a majority or a plurality of string matching techniques that has the highest similarity score as the best match and, therefore, as the part name that is referenced by the data record.

The method and apparatus of one embodiment may differently weight the results provided by the various string matching techniques such that the results of the more heavily weighted string matching technique(s) more greatly affects any voting that is conducted from amongst the results of the various string matching techniques than more lightly weighted string matching technique(s). The weighting of the results of the various string matching techniques may be determined in various manners. For example, one or more of the string matching techniques may be considered to provide more accurate results for certain types of part names, such as part names comprised of combinations of letters and numbers, part names that are longer, etc., and may therefore be more heavily weighted. Additionally or alternatively, user feedback may be provided as to the accuracy of the results provided by the various string matching techniques with the feedback being utilized subsequently to differently weight the results of the string matching techniques.

According to embodiments of the present disclosure, data records may therefore be reviewed in an automated fashion in order to identify one or more data records that reference a particular standard name, such as a particular part name. The resulting data records may then be reviewed to identify issues or trends associated with the part or to otherwise obtain status information related to maintenance activities associated with the part. By processing the data records in the manner described above, however, the data records may be processed in an efficient manner and the confidence level with respect to the data record(s) that are identified may be enhanced. Indeed, by initially identifying maintenance expressions, such as maintenance action verbs, and then identifying head nouns in proximity to the maintenance expressions, the efficiency with which the data records are analyzed may be enhanced since there are generally fewer maintenance expressions to be considered.

In some instances, the potential matches that are identified by the methods and apparatus of embodiments of the present disclosure may be provided to the user, such as by being displayed for the user. In this regard, and as shown in FIG. 2, the data record 30 and the part names 32 that are potential matches may be provided as well as, in some embodiments, the associated similarity scores 34. In response, a user may select a particular one of the standard names that are potential matches as being the name that is referenced in the data record, thereby identifying the best match. Indeed, as illustrated in FIG. 3, the method and apparatus of one embodiment may also permit a user to modify the standard names that have been identified as potential matches by adding one or more additional standard names as potential matches or by deleting one or more standard names that have been identified as potential matches. Based upon the input provided by the user in terms of a selection of one of the standard names that were identified as potential matches as being the best match, the method and apparatus of one embodiment may learn from the input provided by the user such that data records that are subsequently considered that have the same or a similar identification of a part name will identify the standard name selected by the user as a potential match and will associate a greater similarity score with the standard name that was previously selected by the user such that the standard name selected by the user in this instance may be more frequently automatically selected in subsequent iterations.

By relying upon guided pattern matching, information theory and machine learning in at least some embodiments, the method and apparatus may provide enhanced identification of standard names within data records. In this regard, the method and apparatus of one embodiment may utilize guided pattern matching to identify candidate part name strings in data records that are proximate to a maintenance expression, such as a maintenance action verb, and to then identify the best match from among a listing of standard names. With respect to the information theory, the method and apparatus of embodiments of the present disclosure may weight different parts of the standard names differently depending upon the uniqueness and importance of the different parts to the standard name, such as by differently considering the head noun from the core modifier and the peripheral modifier. Further, the method and apparatus of embodiments of the present disclosure may utilize machine learning to refine parameters, such as similarity scores, based on input provided by a user in identifying one of a plurality of standard names that are considered potential matches as being the standard name that is referenced in a respective data record.

The method of identifying standard names with data records may be automated and, as such, may be implemented by a computer 40, such as depicted in FIG. 4. In this regard, the computer of FIG. 4 includes processing circuitry 42 that is configured to perform data processing, application execution and other processing and management services according to an exemplary embodiment of the present disclosure. For example, the processing circuitry may perform the functions identified by FIG. 1 and described above. The processing circuitry may be embodied as a circuit chip (e.g., an integrated circuit chip) or processor configured (e.g., with hardware, software or a combination of hardware and software) to perform operations described herein. However, in some embodiments, the processing circuitry may be embodied as a portion of a server, computer, laptop, workstation, or any one or more of various other computing devices. In an exemplary embodiment, the computer 40 of FIG. 4 also includes one or more memory devices 44 such as, for example, volatile and/or non-volatile memory that may be either fixed or removable. The memory devices may be configured to store information, data, applications, instructions or the like for enabling the processing circuitry 42 to carry out various functions in accordance with exemplary embodiments of the present disclosure. For example, the memory device could be configured to buffer input data for processing by the processing circuitry and to store the predefined list of maintenance expressions and the list of standard names that are described above. Additionally or alternatively, the memory device could be configured to store instructions for execution by the processing circuitry.

The computer 40 can also include a display 46 for presenting the displays of FIGS. 2 and 3, for example. Additionally, the computer can include a user interface 48 for receiving input from a user, such as the selection of a potential match as the best match. As such, the user interface may include, for example, a keyboard, a mouse, a cursor control device, a joystick, a touch screen display, a conventional display, a microphone, a speaker, or other input/output mechanisms. As shown in FIG. 4, the display and the user interface may both be in communication with and operate under the control of the processing circuitry 42.

As noted above, the processing circuitry 42 may include a processor. The processor may be embodied in a number of different ways. For example, the processor may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an exemplary embodiment, the processor may be configured to execute instructions stored in the memory device 44 or otherwise accessible to the processor. As such, whether configured by hardware or software methods, or by a combination thereof, the processor may represent an entity (e.g., physically embodied in circuitry) capable of performing operations according to embodiments of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

Embodiments of method and apparatus of the present disclosure may therefore be practiced using a computer 40 such as depicted in FIG. 4. However, other embodiments may be practiced in connection with a computer program product configured to perform in accordance with embodiments of the present disclosure. In this regard, FIG. 1, as described above, is an illustration of a method and program product according to exemplary embodiments. Each block or step of FIG. 1, and combinations of blocks in FIG. 1, may be implemented by various means, such as hardware, firmware, processor, circuitry and/or another device associated with execution of software including one or more computer program instructions. Thus, for example, one or more of the procedures described above may be embodied by computer program instructions, which may embody the procedures described above and may be stored by a storage device (e.g., memory device 44) and executed by processing circuitry 42 (e.g., processor).

As will be appreciated, any such stored computer program instructions may be loaded onto a computer or other programmable apparatus (i.e., hardware) to produce a machine, such that the instructions which execute on the computer or other programmable apparatus implement the functions specified in the flowchart block(s) or step(s). These computer program instructions may also be stored in a computer-readable medium comprising memory that may direct a computer or other programmable apparatus to function in a particular manner, such that the instructions stored in the computer-readable memory produce an article of manufacture including instructions to implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method comprising:
analyzing a set of target part names into a head noun and any modifiers;
identifying an expression from a set of desired maintenance expressions within a data record;
identifying, with a processor, a candidate part name string including identifying a head noun that was identified during analysis of the set of target part names and that is within a window that is positioned within the data record based upon the expression; and
separately matching the candidate part name string to respective ones of a plurality of target part names with each of a plurality of string matching techniques.

2. A method according to claim 1 wherein identifying the candidate part name string further comprises identifying a modifier.

3. A method according to claim 2 wherein identifying the modifier comprises identifying the modifier proximate to an occurrence of the head noun outside of the window.

4. A method according to claim 1 further comprising determining a similarity score for each of a plurality of matches of the candidate part name string.

5. A method according to claim 4 further comprising identifying each match that has a similarity score bearing a predefined relationship to a threshold.

6. A method according to claim 1 further comprising identifying a best match from among a plurality of matches of the candidate part name string.

7. A method according to claim 6 wherein identifying the best match comprises voting amongst the plurality of string matching techniques to identify the best match.

8. An apparatus comprising:
a processor configured to analyze a set of target part names into head nouns and any modifiers and to identify an expression from a set of desired maintenance expressions within a data record, said processor also configured to identify a candidate part name string by identifying a head noun that was identified during analysis of the set of target part names and that is within a window that is positioned within the data record based upon the expression, said processor further configured to separately match the candidate part name string to respective ones of a plurality of target part names with each of a plurality of string matching techniques.

9. An apparatus according to claim 8 wherein the processor is configured to identify the candidate part name string by identifying a modifier.

10. An apparatus according to claim 9 wherein the processor is configured to identify the modifier by identifying the modifier proximate to an occurrence of the head noun outside of the window.

11. An apparatus according to claim 8 wherein the processor is further configured to determine a similarity score for each of a plurality of matches of the candidate part name string.

12. An apparatus according to claim 11 wherein the processor is further configured to identify each match that has a similarity score bearing a predefined relationship to a threshold.

13. An apparatus according to claim 8 wherein the processor is further configured to identify a best match from among a plurality of matches of the candidate part name string.

14. An apparatus according to claim 13 wherein the processor is configured to identify the best match by voting amongst the plurality of string matching techniques.

15. A computer program product comprising a non-transitory computer-readable storage medium having computer-readable program code portions stored therein, the computer-readable program code portions comprising:
an executable portion configured to analyze a set of target part names into head nouns and any modifiers;
an executable portion configured to identify an expression from a set of desired maintenance expressions within a data record;
an executable portion configured to identify a candidate part name string by identifying a head noun that was identified during analysis of the set of target part names and that is within a window that is positioned within the data record based upon the expression; and
an executable portion configured to separately match the candidate part name string to respective ones of a plurality of target part names with each of a plurality of string matching techniques.

16. A computer program product according to claim 15 wherein the executable portion configured to identify the candidate part name string is further configured to identify a modifier.

17. A computer program product according to claim 15 further comprising an executable portion configured to determine a similarity score for each of a plurality of matches of the candidate part name string.

18. A computer program product according to claim 17 further comprising an executable portion configured to identify each match that has a similarity score bearing a predefined relationship to a threshold.

19. A computer program product according to claim 15 further comprising an executable portion configured to identify a best match from among a plurality of matches of the candidate part name string.

20. A computer program product according to claim 19 wherein the executable portion configured to identify the best match is further configured to vote amongst the plurality of string matching techniques to identify the best match.

21. A method according to claim 1 wherein identifying an expression from a set of desired maintenance expressions comprises identifying a maintenance action verb from a set of maintenance expressions within the data record.

22. A method according to claim 1 wherein the target part names comprise standard part names.

23. An apparatus according to claim 8 wherein the processor is configured to identify an expression from a set of desired maintenance expressions by identifying a maintenance action verb from a set of maintenance expressions within the data record.

24. An apparatus according to claim 8 wherein the target part names comprise standard part names.

25. A computer program product according to claim 15 wherein the executable portion configured to identify an expression from a set of desired maintenance expressions comprises an executable portion configured to identify a maintenance action verb from a set of maintenance expressions within the data record.

26. A computer program product according to claim 15 wherein the target part names comprise standard part names.

\* \* \* \* \*